(12) United States Patent
Newhouse

(10) Patent No.: US 9,739,416 B2
(45) Date of Patent: *Aug. 22, 2017

(54) METHOD FOR MOUNTING ELECTRICAL EQUIPMENT TO CEILING OR TO CEILING SUPPORT STRUCTURE

(71) Applicant: Chris Newhouse, Burlington (CA)

(72) Inventor: Chris Newhouse, Burlington (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/345,966

(22) Filed: Nov. 8, 2016

(65) Prior Publication Data

US 2017/0082243 A1  Mar. 23, 2017

Related U.S. Application Data

(63) Continuation of application No. 15/077,455, filed on Mar. 22, 2016, now Pat. No. 9,518,699, which is a continuation of application No. 14/358,253, filed as application No. PCT/CA2012/001089 on Nov. 16, 2012, now Pat. No. 9,322,509.

(60) Provisional application No. 61/560,325, filed on Nov. 16, 2011.

(51) Int. Cl.
*A47G 29/00* (2006.01)
*F16M 13/02* (2006.01)
*H04N 7/18* (2006.01)

(52) U.S. Cl.
CPC .......... *F16M 13/027* (2013.01); *H04N 7/183* (2013.01)

(58) Field of Classification Search
CPC .. E04B 9/006; F16L 3/133; F16L 3/24; F16M 13/027; F21V 21/048
See application file for complete search history.

(56) References Cited

U.S. PATENT DOCUMENTS

| | | |
|---|---|---|
| 898,391 A | 9/1908 | Peterson |
| 1,606,288 A | 11/1926 | Bennett |
| 2,161,782 A | 6/1939 | Flower |
| 2,963,251 A | 12/1960 | Fuss |
| 3,504,172 A | 3/1970 | Liberman |
| 3,752,258 A | 8/1973 | Ishikawa |
| 4,361,992 A | 12/1982 | Rapp |
| 4,448,388 A | 5/1984 | Dennis |
| 4,518,141 A | 5/1985 | Parkin |
| 4,714,230 A | 12/1987 | Huang |
| 5,085,393 A | 2/1992 | Ryan |
| 5,090,654 A | 2/1992 | Ridings et al. |
| 5,255,884 A | 10/1993 | O'Neill |

(Continued)

FOREIGN PATENT DOCUMENTS

EP  1336696  8/2003

*Primary Examiner* — Bradley Duckworth
(74) *Attorney, Agent, or Firm* — Norris McLaughlin & Marcus, P.A.

(57) ABSTRACT

The truss mounting bracket simplifies installation of electronic type equipment below fabricated trusses commonly used in warehouse and other buildings. The mounting bracket includes a housing having at one end thereof a structure for connecting with an electrical conduit section. The opposite end of the housing is adapted to allow securement below a fabricated truss. A head portion extends from a center portion of the housing and has a thread connection therewith. The head portion engages the truss and allows the housing to be tightened against the lower surface of the truss. The conduit and the housing allow electrical cables to pass through the conduit and at least partially through the housing.

20 Claims, 3 Drawing Sheets

(56) References Cited

U.S. PATENT DOCUMENTS

| | | |
|---|---|---|
| 5,551,658 A | 9/1996 | Dittmer |
| 6,234,757 B1 | 5/2001 | Pearce |
| 6,290,568 B1 | 9/2001 | Hou |
| 6,443,412 B1 | 9/2002 | Kuhn |
| 7,281,867 B2 | 10/2007 | Takahashi |
| 7,374,057 B2 | 5/2008 | Hendrickson |
| 7,440,027 B2 | 10/2008 | Weaver |
| 7,481,410 B2 | 1/2009 | Umberg |
| 7,738,245 B1 | 6/2010 | Stifal |
| 7,793,988 B1 | 9/2010 | Shemtov |
| 7,967,272 B2 | 6/2011 | Nilsen et al. |
| 2005/0055945 A1 | 3/2005 | Hartwick |
| 2005/0252135 A1 | 11/2005 | Hartwick |
| 2006/0101745 A1 | 5/2006 | Kleege |
| 2006/0254190 A1 | 11/2006 | Hunt |
| 2008/0030939 A1 | 2/2008 | Gillespie et al. |
| 2011/0309041 A1 | 12/2011 | Amadio et al. |
| 2012/0305727 A1 | 12/2012 | Bouissiere |

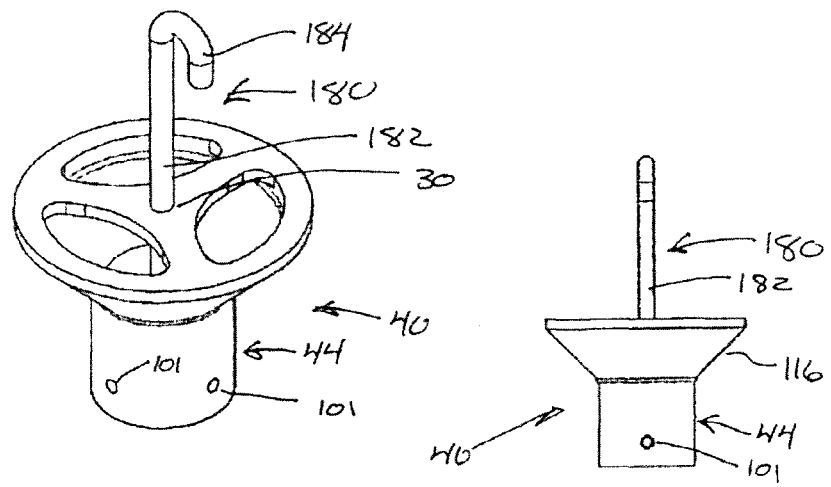
Figure 5
Figure 6
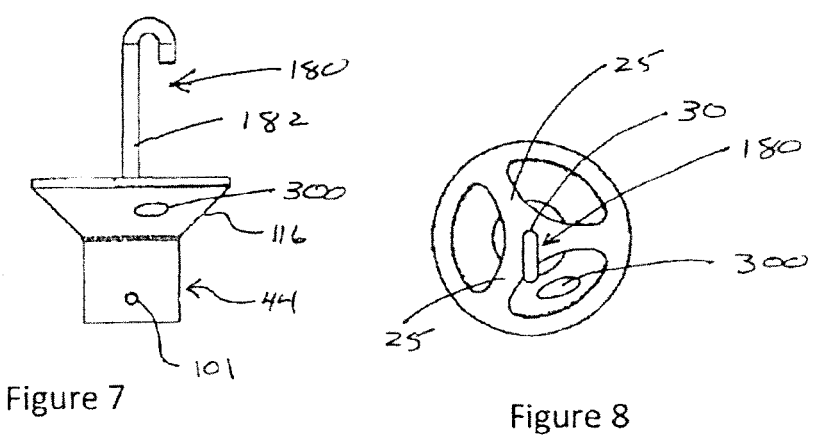
Figure 7
Figure 8

METHOD FOR MOUNTING ELECTRICAL EQUIPMENT TO CEILING OR TO CEILING SUPPORT STRUCTURE

REFERENCE TO RELATED APPLICATION

This is a continuation application of Ser. No. 15/077,455, filed Mar. 22, 2016, currently allowed, which is in turn a continuation application of Ser. No. 14/358,253, filed May 15, 2014, now patented which claims benefit of U.S. provisional application 61/560,325 filed Nov. 16, 2011. The subject matter of the aforementioned prior applications is hereby incorporated herein by reference.

BACKGROUND

The present invention relates to a mounting bracket for a fabricated steel truss that is suitable for suspending video surveillance cameras, security devices or other equipment from a fabricated truss and a method for mounting electrical equipment. The mounting bracket accommodates electrical conductors to allow for powering of the mounted equipment.

Security devices in both warehouse and retail applications commonly use video surveillance cameras or other sensing devices that are suspended from a fabricated steel truss or the like structure used for supporting roofs. The most common exposed steel trusses are of a composite design and have a two-piece lower chord member typically L-shaped angle brackets placed in a back-to-back spaced orientation. Rod web members are welded between the angle brackets and connect to a top chord structure. With roof trusses of this design, there is a center gap between the back-to-back L-shaped angle brackets and this center gap allows a securing member to pass therebetween and engage an upper surface of the lower chord.

United States Publication 2006/0254190 discloses a mounting bracket for a fabricated roof truss of the type described above. This mounting bracket includes a multi-component structure having a series of members engaging the upper flange of the lower chord member and a lower portion for engaging the bottom surface of the lower chord.

Although this structure is an improvement over many existing designs, it still is relatively complicated and includes multiple components that require a relatively sophisticated mounting procedure.

The present invention provides a simplified arrangement that reduces installation time and simplifies the installation process for security and similar devices to be suspended below a fabricated truss.

The present invention provides an improved mounting bracket that is easier to install and more aesthetically pleasing. The overall look of the mounting bracket is an important aspect as these types of suspended systems are now commonly used in retail applications and will certainly be visible to the consumers.

SUMMARY OF THE INVENTION

A mount bracket for a steel truss according to the present invention comprises a housing and a suspending member that cooperates with the housing for securing of the mount bracket. The housing includes a first section having a generally planar mount surface as one end thereof and a tubular collar at a narrow end of said first section opposite the mount surface. The mount surface includes a center mount area about a threaded port that is aligned with an axis of the first section. The center mount area has two or more arms extending outwardly therefrom and structurally attached to the first section with cable passage ports being defined between the center mount portion and the first section. The suspending member includes a threaded shank received in and structurally engaging the threaded port. The suspending member includes a hook portion at one end thereof sized for engaging a lower chord member of a fabricated steel truss. Preferably the first section has a conical shape.

According to an aspect of the invention the center mount area includes three or four arms spaced about the center mount area with the cable passage ports being located between each of the adjacent arms of the three or four arms.

In yet a further aspect of the invention the center mount area and the threaded port are aligned with a longitudinal axis of the first section.

In a further aspect of the invention the first section, the tubular collar, the arms and the center mount area are part of an integral casting.

In yet a further aspect of the invention the tubular collar includes a threaded stop member passing through and engaging port in the tubular sleeve. The threaded stop member engages an electrical conduit having an end received in and retained in the sleeve portion. The threaded stop member preferably presses against and fixedly engages the end of the electrical conduit in the tubular sleeve.

In yet a further aspect of the invention the three or four arms are three arms with three cable passage ports located between adjacent arms with each of the ports being of an oval shape in top view of the housing.

In a further aspect of the invention the one end of the suspended member is defined by a curved hook portion integral with the shank.

In an aspect of the invention the hook portion is defined by a 'T' shaped head.

In a further aspect of the invention the curved hook portion is made to one side of a longitudinal axis of the shank.

In a further aspect of the invention the conduit at an end remote the housing supports a surveillance camera.

In yet a further aspect of the invention the surveillance camera includes a cable harness that passes through the conduit and through one of the cable passage ports and passes through a lower chord of a roof truss.

In a further aspect of the invention the housing includes a sidewall port to allow cabling to pass therethrough.

BRIEF DESCRIPTION OF THE DRAWINGS

Preferred embodiments of the invention are shown in the drawings wherein:

FIG. 5 is a perspective view of an alternate mounting bracket with a hook securement member and for attachment to the lower chord;

FIGS. 6 and 7 are side views of the alternate mounting bracket of FIG. 5; and FIG. 8 is a top view of the alternate mounting bracket.

DETAILED DESCRIPTION OF THE PREFERRED EMBODIMENTS

Figures 1, 2:
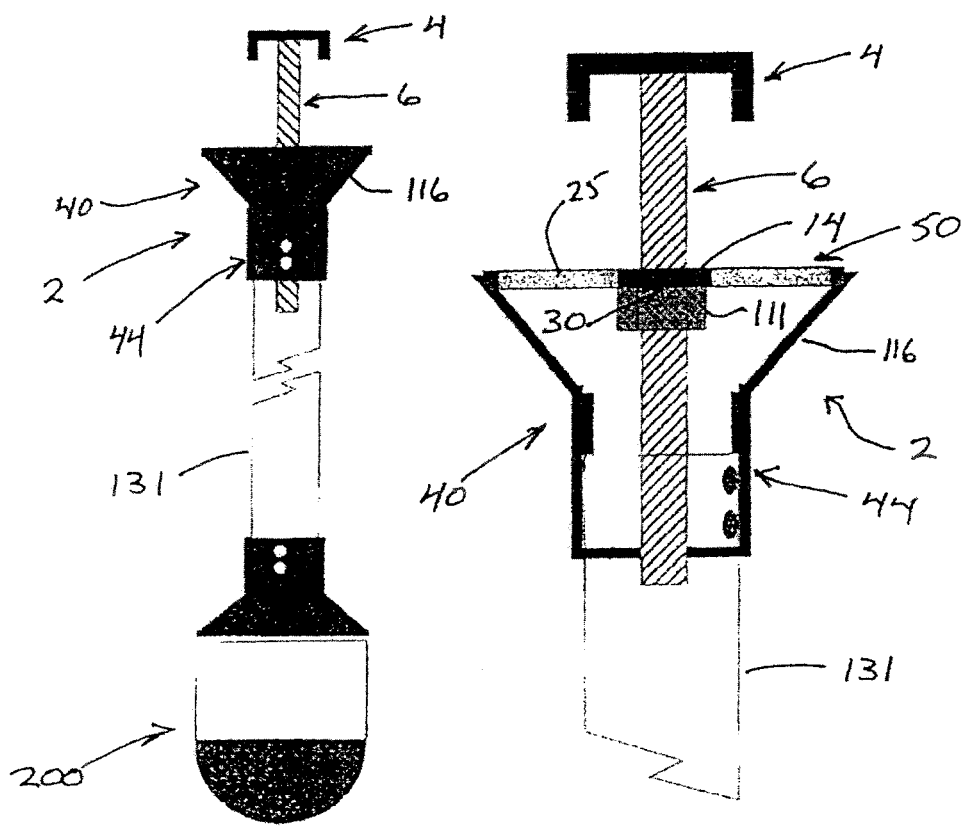
FIG. 1 is a side view of a mounting bracket of the invention with a supported security camera.
FIG. 2 is a partial sectional through the mounting bracket.
Figure 3:
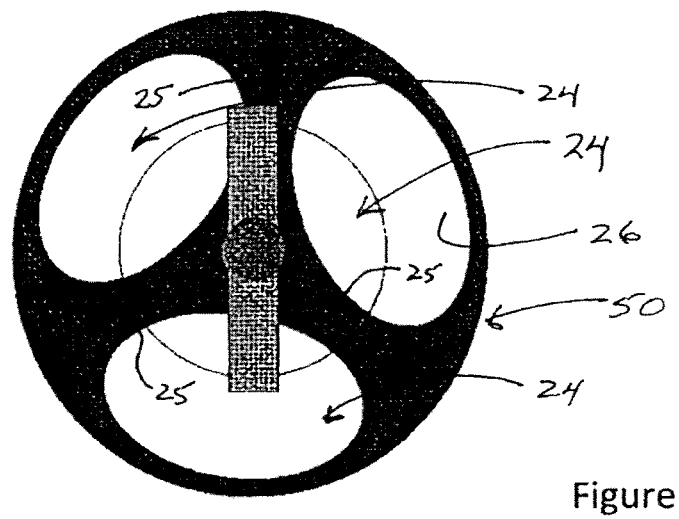
FIG. 3 is a top view of the mounting bracket.
Figure 4:
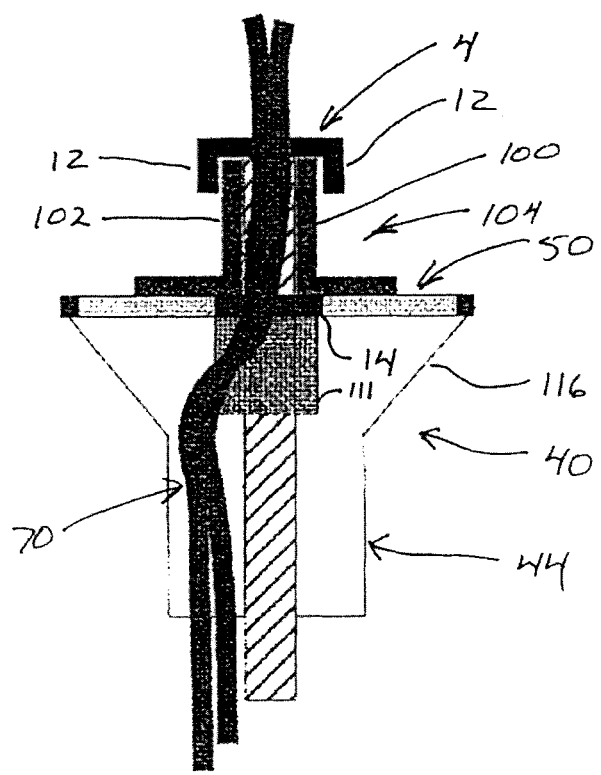
FIG. 4 is a partial sectional view showing electrical cables being fed through one of the ports of the mount bracket.

The truss mounting bracket 2 shown in FIGS. 1 through 4 includes a T-shaped head 4 fixedly secured to the threaded rod 6. The T-shaped head 4 is sized to pass through the gap between two L-shaped angle members 100 and 102 of the lower chord 104 of a fabricated steel truss (see FIG. 3). Once the T-shaped head 4 passes through the gap, it is rotated 90.degree. and lowered such that the top of the T engages the top edge of the lower chord member 104. This T-shaped head 4 includes downwardly angled flanges 12 to engage the sides of the L-shaped angle members and hold the threaded rod 6 against rotation. The threaded rod 6 engages the threaded center section 14 of the housing 40. The threaded center section 14 is connected to the conical section 116 by the arm portions 20 (see FIG. 2). Large oval shaped ports 24 are defined between the peripheral wall 26 of the conical section and a center threaded port 30 provided in the center section 14. The oval ports 24 are located between support arms 25 connected to and supporting the center section 14. Three arms 25 are shown, however two or four arms would also be satisfactory.

With this arrangement the housing 40, which includes the conical section 26 and the integral tubular sleeve 44, can be rotated and thus the housing is drawn up towards the T-shaped head. This allows the housing to be tightened against the bottom surface of the lower chord whereby the generally planar upper mounting face 50 of the conical section 26 engages the lower face of the chord and locks therewith. If desired a locking nut 111 may be threaded on the bottom portion of the threaded rod 6 and secured up against the center section 14. A long socket wrench can be used for driving of the nut. This provides an effective lock. It has been found such a lock nut is generally not required but in some applications where high vibration may be incurred or where additional confidence in the mounting is required, a lock nut may be used.

With this arrangement a conduit 131 (see FIG. 4) is received in the tubular sleeve 44 and is held in this tubular sleeve portion by a lock bolt 52 or other securing member. The tubular sleeve 44 is sized to cooperate with a standard size electrical conduit and thus the equipment to be suspended below the truss, can be located at different spacing below the truss merely by appropriately cutting a length of standard conduit. Fasteners, such as threaded screws or bolts can be secured in ports 101 to secure the conduit to the tubular sleeve 44. The use of standard conduit is also advantageous due to its low cost and availability.

In the case of electrical equipment, for example, surveillance camera 200 (shown in FIG. 1) or video surveillance cameras, cables 70 can pass up from the electrical device through the electrical conduit and through the housing. The oval ports 24 are provided in the housing and one of these ports will be generally aligned with the gap in the lower surface of the truss.

As previously described, the lower chord member 106 includes back-to-back angle members 100, 102 separated by the web bars which are only provided at space points in the truss. Thus there is a gap between the angled members and one of the oval ports 24 will align with this gap. In this way, electrical cables shown as 70 (FIG. 4) can pass upwardly through the housing and through one of the ports 24 and through the gap between the angled members of the truss. Typically these electrical cables can then be secured to the lower chord of the truss and appropriately connected to receive power. With this arrangement feeding of the cabling is completed after securement of the housing below the lower chord.

The housing 40 is preferably a single piece casting such that the conical section 116 and the tubular sleeve 44 as well as the arms are all integral. The ports 24 can be made as a part of the casting and thus the housing includes a generally clear center portion for allowing of the cabling to pass therethrough. As can be appreciated the T-shaped head and threaded rod form a suspending member where the threaded rod shank engages the center section. The conical section provides additional room for the cables to pass by the securement arms and the oval ports are positioned such that one of the ports will generally align with the center gap of the fabricated truss.

It is also possible for any cables to pass through a sidewall of the conical section rather than passing through one of the ports in the planar face 50.

FIGS. 5 through 8 illustrate a preferred structure where the T-shaped bolt and threaded rod have been replaced by a single hook shaped suspending member 180 having a threaded shank 182 engaging the center port 30 of the housing and a hooked end portion 184 positioned upwardly of the housing for engaging the upper flange of the lower chord of a fabricated truss. The port 300 in the housing (see FIGS. 7 and 8) allows cables to pass through the sidewall of the housing. With this arrangement the device, the conduit and the electrical cabling are assembled to the housing. The housing with the suspending member 180 can be loosely secured below a lower chord. The housing and the device are rotated to draw the housing up against the lower chord. The electrical cables merely rotate with the housing. Once the housing is secured below the lower chord, the electrical cables can pass upwardly to the truss on the outside of the housing for appropriate electrical connection.

FIGS. 6 and 7 are side views of the alternate embodiment where the hook portion 184 projects above the housing for engaging one of the angle iron members of the lower chord of a truss. The housing can be rotated on the threaded shank 182 and moved upwardly to engage the lower surface of the truss. This can be effectively threaded by hand and considerable force can be exerted on the housing such that it is normally not necessary to use a tool to securely tighten the housing beneath the lower surface of the truss.

The alternate mounting bracket of FIGS. 5 through 8 allows initial assembly of the mounting bracket to a length of standard conduit 202 and a surveillance camera or other device 300. The mounting bracket with the suspending member, i.e. the threaded bolt and hook portion 184, can be in a loose position, however the threaded portion is still in engagement with the housing. With one hand, the user can align the hook portion with the lower gap of a truss. The hook portion can then pass between the two angled members of the lower chord. Once the hook clears the upper surface of the angled members, it is rotated approximately 90.degree. and then allowed to move downwardly such that the hook portion engages one of the angled members. Once the hook portion has been so located the housing preferably is rotated by hand to effectively secure the housing beneath the lower surface of the lower chord.

The alternate mounting bracket includes the through the wall port 300 located in and opening into the conical housing. Electrical wiring from the surveillance camera or other device can be fed through this port prior to installation. The entire assembly, for example, camera, conduit and conical housing are rotated to quickly thread the housing on the hook bolt and draw the housing up against the truss. Once secured beneath the truss the wiring can be fed along the truss for connection to related equipment. If desired it is possible to feed the wiring through the housing and truss as previously described with respect to FIGS. 1 to 4. In this case a cap or closing member preferably closes port 300.

The time required to mount this type of structure is greatly reduced with either embodiment and a considerable benefit with respect to installation and labour is realized. These structures are compatible with composite roof truss structures used in warehousing and many retail applications. A further advantage of this system is the simplicity in relocating of the device if required. For example, if it is necessary to move the camera marginally on the truss, the process is not particularly difficult. Typically the cable is disconnected and the housing is partially rotated to allow sliding of the mount bracket on the lower surface of the truss. The device can then be appropriately relocated and secured. The cabling is then reconnected.

Depending upon the particular application, it may be necessary to fully remove the mount bracket from the lower surface of the truss to relocate to a different gap between structural members of the web of the truss. Although this is somewhat more time consuming, it typically requires disconnecting of the cabling, loosening of the housing from the threaded bolt, removal of the threaded bolt from the truss followed by the relocation and resecurement of the housing. This can typically be done by the end user or a nonskilled labourer.

This ability to easily relocate the structure is quite valuable as retail layouts change from time to time and similarly warehouse layouts change. This provides a simplified approach to accommodate different layouts as may be required from time to time. Furthermore, it may be desirable to relocate existing equipment from one location to a different location within the space and this is easily accomplished with the present structure.

This under truss mounting bracket has particular application for mounting surveillance cameras, detectors and sensors however other electrical equipment can also be secured including electrical fans, lighting, signage, wireless access points and other related equipment.

Although preferred embodiments of the invention have been described herein, it would be understood by those of skill in the art that variations may be made thereto without departing from the invention as defined in the appended claims.

The invention claimed is:

1. A method for mounting electrical equipment, comprising:
   securing a single suspending member to a support, the suspending member comprising a threaded rod;
   rotatably coupling the threaded rod of the single suspending member with a threaded section of a housing;
   threadedly rotating the housing about the threaded rod to rotate the housing while advancing it towards a bottom surface of the support whereby the housing continues to rotate until a mounting face of the housing engages the bottom surface of the support and locks therewith; and
   coupling the electrical equipment to the housing so that the electrical equipment is suspended below the support.

2. The method of claim 1, wherein coupling the electrical equipment to the housing comprises securing an electrical conduit to a tubular sleeve on the housing and securing the electrical equipment to the electrical conduit.

3. The method of claim 1, wherein the support is a truss.

4. The method of claim 3, wherein:
   the truss is a fabricated truss comprising two L-shaped angle members arranged in back-to-back spaced orientation with a gap therebetween to form a lower chord of the truss; and
   the bottom surface of the support is a bottom surface of the lower chord.

5. The method of claim 4, further comprising passing cables up from the electrical device through a port in the housing and through a gap between the two L-shaped angle members of the truss.

6. The method of claim 5, wherein the port is formed through the mounting face of the housing.

7. The method of claim 1, wherein the electrical equipment is a surveillance camera.

8. The method of claim 4, wherein:
   the suspending member includes a T-shaped head fixedly secured to the threaded rod;
   the T-shaped head is sized to pass through the gap between the two shaped angle members; and
   securing the suspending member to the support comprises:
   passing the T-shaped head through the gap; and
   once the T-shaped head has passed through the gap, rotating the T-shaped head about 90° and lowering the T-shaped head such that a top of the T engages the top edge of the lower chord.

9. The method of claim 8, wherein the T-shaped head includes downwardly angled flanges to engage the sides of the L-shaped angle members and hold the threaded rod against rotation.

10. The method of claim 1, wherein the suspending member is a single hook shaped suspending member having a threaded shank.

11. A method for mounting electrical equipment for a single suspending member secured to a support wherein the suspending member comprises a threaded rod, the method comprising:
    rotatably coupling the threaded rod of the single suspending member with a threaded section of a housing;
    threadedly rotating the housing about the threaded rod to rotate the housing while advancing it towards a bottom surface of the support whereby the housing continues to rotate until a mounting face of the housing engages the bottom surface of the support and locks therewith; and
    coupling the electrical equipment to the housing so that the electrical equipment is suspended below the support.

12. The method of claim 11, wherein coupling the electrical equipment to the housing comprises securing an electrical conduit to a tubular sleeve on the housing and securing the electrical equipment to the electrical conduit.

13. The method of claim 11, wherein the support is a truss.

14. The method of claim 13, wherein:
    the truss is a fabricated truss comprising two L-shaped angle members arranged in back-to-back spaced orientation with a gap therebetween to form a lower chord of the truss; and
    the bottom surface of the support is a bottom surface of the lower chord.

15. The method of claim 14, further comprising passing cables up from the electrical device through a port in the housing and through a gap between the two L-shaped angle members of the truss.

16. The method of claim 15, wherein the port is formed through the mounting face of the housing.

17. The method of claim 11, wherein the electrical equipment is a surveillance camera.

18. The method of claim 14, wherein the suspending member includes a T-shaped head fixedly secured to the threaded rod.

19. The method of claim 18, wherein the T-shaped head includes downwardly angled flanges.

20. The method of claim 11, wherein the suspending member is a single hook shaped suspending member having a threaded shank.

* * * * *